United States Patent
Yang

(10) Patent No.: US 8,089,618 B2
(45) Date of Patent: Jan. 3, 2012

(54) LASER DISTANCE MEASURING DEVICE

(75) Inventor: Dezhong Yang, Nanjing (CN)

(73) Assignee: Chervon Limited, Wanchai (HK)

( * ) Notice: Subject to any disclaimer, the term of this patent is extended or adjusted under 35 U.S.C. 154(b) by 68 days.

(21) Appl. No.: 12/590,366

(22) Filed: Nov. 6, 2009

(65) Prior Publication Data

US 2010/0123893 A1 May 20, 2010

(30) Foreign Application Priority Data

Nov. 17, 2008 (CN) ...................... 2008 2 0216153 U

(51) Int. Cl.
*G01C 3/08* (2006.01)
(52) U.S. Cl. ...................... 356/4.01; 356/5.01
(58) Field of Classification Search ............... 356/4.01, 356/5.01, 28
See application file for complete search history.

(56) References Cited

U.S. PATENT DOCUMENTS 6,288,383 B1 * 9/2001 Urbach et al. ............. 250/201.5
7,177,015 B2   2/2007 Ohtomo et al.
2008/0094605 A1   4/2008 Drodofsky et al.

FOREIGN PATENT DOCUMENTS

JP          08304546 A  * 11/1996
* cited by examiner

*Primary Examiner* — Isam Alsomiri
(74) *Attorney, Agent, or Firm* — McDermott Will & Emery LLP

(57) ABSTRACT

The laser distance measuring device of the present invention comprises an emitting part having a laser generating device with a first spectral bandwidth arranged on an emitting optical path and a collimating lens. The emitting part also has an optical filter with a second spectral bandwidth which is less than the first spectral bandwidth. The laser distance measuring device also has a receiving part having a photoelectric receiving and conversion device to receive the measuring beam reflected by the object to be measured and convert it into an electric signal. Using the optical filter, most of the unneeded portions of the laser beam emitted from the laser are filtered out so that the useful proportion of the measuring beam of the laser beam is improved and the ranging capability of the laser distance measuring device under a bright or strong light environment is enhanced.

17 Claims, 1 Drawing Sheet

LASER DISTANCE MEASURING DEVICE

CROSS-REFERENCE TO RELATED APPLICATIONS

This application claims priority under 35 U.S.C. §119 to CN 200820216153.X filed Nov. 17, 2008, which is hereby incorporated by reference.

FEDERALLY SPONSORED RESEARCH OR DEVELOPMENT

Not Applicable.

TECHNICAL FIELD

The present invention relates to a laser distance measuring device, and more particularly to a hand-held laser distance measuring device.

BACKGROUND OF THE INVENTION

Laser distance measuring devices have been widely used in construction, interior decoration and other fields due to their high accuracy of measurement. They have a measuring range up to tens of meters and are usually designed to be handheld devices. The general principles of measurement are as follows: an emitter emits an intensity modulated measuring beam to an object to be measured; the measuring beam is reflected or scattered by the object and is picked up by a photoreceiver and the distance from the object to be measured is determined based on the phase position of the modulated measuring beam relative to the emitter.

In the prior art, a filter device with a predetermined bandwidth is usually arranged in front of the photoreceiver. The modulated measuring beam emitted by the emitter has a bandwidth less than the bandwidth of the filter device so that both the measuring beam reflected by the object and some disturbing light, or noise, within the bandwidth of the filter is received by the photoreceiver, while most of the disturbing light is filtered out by the filter device. However, when used in an outdoor strong light environment, the intensity of the disturbing light in the background increases. As a result, the disturbing light received by the photoreceiver increases and the signal to noise ratio (the ratio of the reflected measuring beam signals received by the photoreceiver to the disturbing light signals received by the photoreceiver) decreases, which results in both the ranging capability and effective measurement distance of the laser distance measuring device decreasing when compared to the indoor measurement capabilities. To improve the ranging capability of the laser distance measuring device under a bright or strong light environment, the bandwidth of the filter device can be narrowed to filter out more of the noise signals (i.e., the disturbing light signals), however, additional useful portions of the measuring beam signal will also be filtered out if the bandwidth of the filter device is narrowed. As a result, when the useful portion of the measuring beam signal received by the photoreceiver is reduced along with the noise, the signal to noise ratio is not effectively improved. Further, due to security concerns, there is a limit to the emitting power of the laser distance measuring device. Currently, the upper limit of the maximum power is 1 mW. Accordingly, the ranging capability of the laser distance measuring device cannot be improved by arbitrarily increasing the emitting power of the emitter.

SUMMARY OF THE INVENTION

To overcome the problems explained above, the present invention provides a laser distance measuring device having a higher signal to noise ratio, specifically, a laser distance measuring device with an enhanced ranging capability under a bright or strong light environment.

The present invention provides a laser distance measuring device which has an emitting part arranged on an emitting optical path that emits a measuring beam to an object to be measured. The emitting part comprises a laser generating device for emitting a laser beam with a first spectral bandwidth using a collimating lens. The emitting part also has an optical filter with a second spectral bandwidth which is less than the first spectral bandwidth. The laser distance measuring device also includes a receiving part arranged on a receiving optical path. The receiving part comprises a receiving object and a photoelectric receiving and conversion device which receives the measuring beam reflected by the object to be measured and converts it into an electric signal.

In the prior art, there is not an optical filter element arranged on the emitting optical path of the laser distance measuring device. Also, in the prior art, the effective power of the measuring beam is only a portion of the complete power of the laser beam emitted from the laser generating device. Therefore, in the prior art, the effective power of the measuring beam is significantly less than the upper limit of the maximum power allowed. Compared to the laser distance measuring device without an optical filter element on the emitting optical path, the laser distance measuring device disclosed in the present invention has an optical filter having a spectral bandwidth less than the spectral bandwidth of the laser beam. This allows the non-necessary portions of the laser beam emitted from the laser generating device to be filtered out by the optical filter. Therefore, the proportion of the useful measuring beam of the laser beam emitted from the laser generating device can be improved within the limits of the maximum emitting power allowed by safety regulations, and the power of the useful portions of the measuring beam emitted from the optical filter can be close to or equal to the upper limit of the maximum power allowed by safety regulations. As a result, the signal to noise ratio is improved and the ranging capability of the laser distance measuring device under a bright or strong light environment is enhanced.

DETAILED DESCRIPTION

Figure 1:
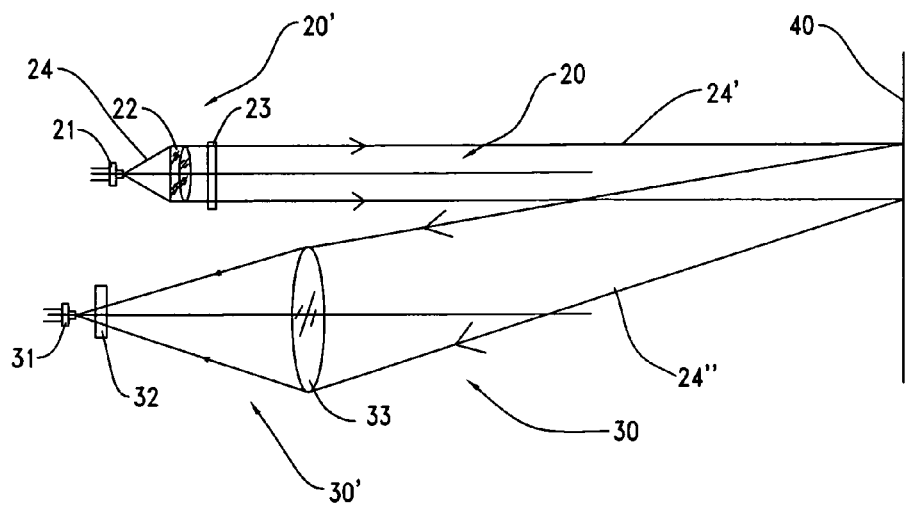
FIG. 1 schematically shows an optical path of a distance measurement of a laser distance measuring device according to a preferred embodiment of the present invention.

Referring to FIG. 1, a laser distance measuring device of a preferred embodiment of the present invention comprises an emitting part 20' arranged on an emitting optical path 20 and a receiving part 30' arranged on a receiving optical path 30. The emitting part 20' includes a laser transmitter 21, a collimating lens group 22 and an optical narrow-band filter 23. The receiving part 30' includes a photoelectric receiving and conversion device 31, an optical narrow-band filter 32 and a convergent lens 33. The laser transmitter 21 emits a laser beam 24. The laser beam 24 is collimated into a collimated laser beam by the collimating lens group 22. The collimated laser beam is then filtered using the optical narrow-band filter 23, and a measuring laser beam 24' is produced and emitted from the laser distance measuring device. The measuring laser beam 24' is reflected or scattered by an object 40 to be measured. A reflected laser beam 24" is converged by the convergent lens 33 which is used as a receiving objective and is filtered by the optical narrow-band filter 32 which is arranged between the photoelectric receiving and conversion device 31 and the convergent lens 33. The reflected laser beam 24" is received by the photoelectric receiving and conversion device 31 and is converted into corresponding electrical signals. The electrical signals containing the distance measurement information are transmitted to a signal processor (not shown in the figure), and the distance between the laser distance measuring device and the object 40 is calculated by the signal processor using the electrical signals.

Figure 2:
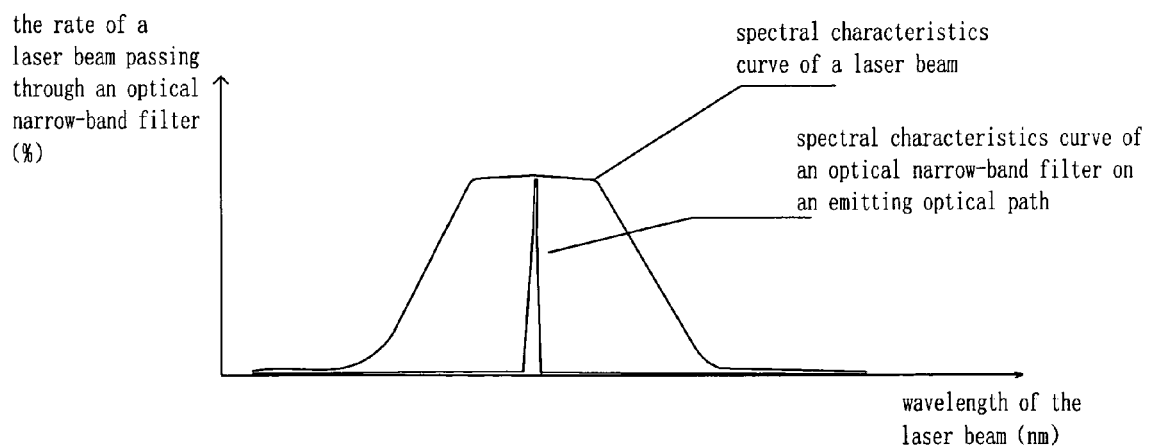
FIG. 2 is a graphic diagram of a spectral bandwidth of an optical narrow-band filter on an emitting optical path and a spectral bandwidth of a laser beam according to the FIG. 1.

Referring to FIG. 2, the optical narrow-band filter 23 arranged in the emitting optical path 20 has a spectral bandwidth which is less than a spectral bandwidth of the laser beam 24. This filters out the part of the laser beam 24 which is outside the bandwidth of the optical narrow-band filter 23 after the laser beam 24 passes through the optical narrow-band filter 23. The laser emitting power of the laser distance measuring device is the emitting power of the measuring laser beam 24'. The power of the laser beam within the bandwidth of the optical narrow-band filter 23 (i.e. the power of the measuring laser beam 24') can be improved by adjusting the emitting power of the laser transmitter 21 so that the intensity of effective laser signals is improved as much as possible under the premise that the emitting power of the measuring laser beam 24' does not exceed an upper limit of the maximum power prescribed by safety regulations. When the power of the laser beam with the bandwidth of the optical narrow-band filter 23 is improved, the signal to noise ratio is also improved.

In a preferred embodiment of the present invention, the optical narrow-band filter 32 is arranged on the receiving optical path 30 and is used to filter out the disturbing light signals in the measurement environment, so that the disturbing light signals outside the bandwidth of the optical narrow-band filter 32 are filtered out. Because of the increased measurement distance of the present invention, the intensity of the reflected laser beam is weakened exponentially. To improve the signal to noise ratio of the electrical signals received by the photoelectric receiving and conversion device 31 and improve the maximum measurement distance at the same time, the energy loss of reflected laser beam 24" should be minimized as much as possible. Preferably the bandwidth of the optical narrow-band filter 32 is set to be equal to the bandwidth of the optical narrow-band filter 23. In other embodiments, the bandwidth of the optical narrow-band filter 32 can be set narrower or wider than the bandwidth of the optical narrow-band filter 23. If the bandwidth of the optical narrow-band filter 32 is less than the bandwidth of the optical narrow-band filter 23, to filter out disturbing light signals more effectively, the ranging capability of the laser distance measuring device under the bright or strong light environment is enhanced. However, because part of the reflected laser beam 24" will also be filtered out, the maximum measurement distance is reduced compared to the preferred embodiment. The optical narrow-band filter 32 is made from substantially the same material as the optical narrow-band filter 23, and they have similar filter characteristics and similar temperature drift characteristics.

It can be easily understood for those skilled in the art that a collimating lens with a filtering function can be arranged in front of the laser transmitter 21 directly, so that the fixing of the optical narrow-band filter 23 is removed. For example, a collimating lens with a filtering function can be obtained by coating the collimating lens group 22 mentioned above with a layer of optical film having a filtering function. In the same way, the optical narrow-band filter 32 arranged on the receiving optical path 30 can also be removed using a convergent lens having a filtering function to replace the original ordinary convergent lens. A person skilled in the art understands that the optical narrow-band filter 23 can be encased within the laser transmitter 21 and the optical narrow-band filter 32 be encased within the photoelectric receiving and conversion device 31. Also, a person skilled in the art understands that the optical narrow-band filter 23 or the optical film having a filtering function on the emitting optical path 20 can be arranged between the laser transmitter 21 and the collimating lens group 22 and may also be located on one side of the collimating lens group 22 which faces away from the laser transmitter 21.

Only the optical paths of the distance measurement of the laser distance measuring device are described above. The related mechanical structures and signal processing circuit parts are disclosed in the prior art and are known to those in the art and will not be described herein.

The above described preferred embodiments are intended to illuminate the principle of the present invention, but not to limit its scope. It can be easily understood for those skilled in the art that many other modifications and variations of these preferred embodiments will be apparent and may be made without departing from the spirit and the scope of the invention as defined in the following claims.

What is claimed is:

1. A laser distance measuring device, comprising:
    an emitting part arranged on an emitting optical path that emits a measuring beam toward an object to be measured, comprising:
        a laser generating device for emitting a laser beam having a first spectral bandwidth; and,
        a collimating lens;
    a receiving part arranged on a receiving optical path, said receiving part comprising:
        a receiving object; and,
        a photoelectric receiving and conversion device to receive the measuring beam reflected by the object to be measured and convert it into an electric signal;
    wherein said emitting part further comprises a first optical filter having a second spectral bandwidth which is less than said first spectral bandwidth.

2. A laser distance measuring device as claimed in claim 1, wherein the first optical filter is an optical narrow-band filter.

3. A laser distance measuring device as claimed in claim 1, wherein the first optical filter is arranged between the laser generating device and the collimating lens.

4. A laser distance measuring device as claimed in claim 1, wherein the first optical filter is encased within the laser generating device.

5. A laser distance measuring device as claimed in claim 1, wherein the first optical filter is arranged on one side of the collimating lens which faces away from the laser generating device.

6. A laser distance measuring device as claimed in claim 1, wherein the first optical filter is an optical film having a filtering function.

7. A laser distance measuring device as claimed in claim 6, wherein the optical film is coated on at least one side of the collimating lens.

8. A laser distance measuring device as claimed in claim 1, wherein the receiving part further comprises a second optical filter.

9. A laser distance measuring device as claimed in claim 8, wherein the second optical filter and the first optical filter have similar filter characteristics.

10. A laser distance measuring device as claimed in claim 8, wherein the second optical filter and the first optical filter have similar temperature drift characteristics.

11. A laser distance measuring device as claimed in claim 8, wherein the second optical filter has a third spectral bandwidth which is less than said first spectral bandwidth.

12. A laser distance measuring device as claimed in claim 11, wherein the third spectral bandwidth is less than or equal to the second spectral bandwidth.

13. A laser distance measuring device, comprising:
an emitting part arranged on an emitting optical path that emits a measuring beam toward an object to be measured, comprising:
　a laser generating device for emitting a laser beam having a first spectral bandwidth; and,
　a collimating lens;
a receiving part arranged on a receiving optical path, said receiving part comprising:
　a receiving object; and,
　a photoelectric receiving and conversion device to receive the measuring beam reflected by the object to be measured and convert it into an electric signal;
wherein said emitting part further comprises a first optical filter having a second spectral bandwidth which is less than said first spectral bandwidth and the receiving part further comprises a second optical filter.

14. A laser distance measuring device as claimed in claim 13, wherein the second optical filter and the first optical filter have similar filter characteristics.

15. A laser distance measuring device as claimed in claim 13, wherein the second optical filter and the first optical filter have similar temperature drift characteristics.

16. A laser distance measuring device as claimed in claim 13, wherein the second optical filter has a third spectral bandwidth which is less than said first spectral bandwidth.

17. A laser distance measuring device as claimed in claim 16, wherein the third spectral bandwidth is less than or equal to the second spectral bandwidth.

* * * * *